Nov. 11, 1958

R. H. SWART, SR 2,860,016

LUBRICATION MEANS

Filed June 1, 1956

INVENTOR.
RICHARD H. SWART, SR.
BY

ATTORNEY.

Nov. 11, 1958 R. H. SWART, SR 2,860,016
LUBRICATION MEANS

Filed June 1, 1956 2 Sheets-Sheet 2

INVENTOR.
RICHARD H. SWART, SR.
BY
ATTORNEY.

United States Patent Office 2,860,016
Patented Nov. 11, 1958

2,860,016

LUBRICATION MEANS

Richard H. Swart, Sr., Syracuse, N. Y., assignor to Carrier Corporation, Syracuse, N. Y., a corporation of Delaware Application June 1, 1956, Serial No. 588,816

11 Claims. (Cl. 309—19)

This invention relates to improved lubrication means, more particularly to an improved means for lubricating the pins employed in coupling pistons to connecting rods.

As in the case of all relatively moving machine parts, so in the case of piston pins, lubrication is both desirable and necessary for proper functioning of the machines in which said pistons are employed. Provision of lubricant between rubbing parts serves to minimize wear, and cools the parts. Those mechanisms in which pistons are employed such as internal combustion engines, steam engines, or reciprocating compressors generally provide a crankcase containing a lubricant. This lubricant is fed in a variety of ways to the piston pins. The simplest method for feeding of the lubricants to the piston pins comprises some sort of splash arrangement whereby rotation of the crank shaft in the crankcase sump will splash the lubricant from the sump about the connecting rod and piston pins. These splash systems are generally adequate where the piston stroke is in a vertical plane, however, with horizontal stroke equipment, such as refrigerant compressors and the like, it is generally found necessary to facilitate the feeding of lubricant to the piston pins by providing some auxiliary lubricating means. Thus, it is often found desirable to provide a lubricant bore in the connecting rod to direct lubricant from the crank pin end of the rod to the piston pin. These bores increase the cost of production, weaken the connecting rod and are of course subject to clogging.

These bores reduce the bearing surface of the crank pin at the position of maximum load. The bores also prevent the building up of a wedge-shaped pressurized oil film between the bearing surfaces thereby causing excess friction and high wear rate.

It is with the above problems in mind that the present means has been evolved, means facilitating the lubrication of the pins of horizontally acting pistons in a simple, readily maintainable, and economical manner.

It is accordingly a primary object of this invention to provide an improved lubrication means.

A further object of this invention is to provide lubrication means for the pins connecting pistons to connecting rods.

It is also an object of this invention to provide means permitting spray lubrication of horizontally acting pistons.

A further object of the invention is to provide means permitting improved cooling of the piston pin.

Another object of this invention is to provide an improved connecting rod construction facilitating the lubrication of the piston pin coupled thereto.

An additional object of this invention is to provide an improved washer construction for facilitating spray lubrication of piston pins.

A still further object of the invention is to provide an improved arrangement for facilitating assembly of the connecting rod and the piston.

These and other objects of the invention which will become apparent from the following specification and claims are achieved by provision of a piston connecting rod provided with a piston pin opening. A substantially U-shaped lubricant distributing member, is provided over the piston end of the connecting rod for guiding lubricant to the piston pin. Flared lubricant collecting flanges are formed on the member which lead to channels directed towards the aforementioned opening.

The specific constructional features of a preferred embodiment of this invention, and their mode of operation will be made most manifest, and particularly pointed out in conjunction with the accompanying drawing, wherein Figure 1 is a partial sectional view of the piston end of the novel connecting rod looking down at the piston pin, and having parts broken away to reveal some of the constructional features of the invention;

Referring more particularly to the drawings, like numerals in the various figures will be taken to designate like parts. As noted above the novel inventive concept may be embodied in a variety of structural arrangements implementing the assembly of a piston and a connecting rod, and facilitating the lubrication of the relatively moving parts.

Figure 1:
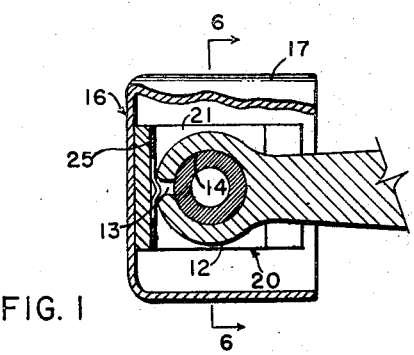
Figure 7:
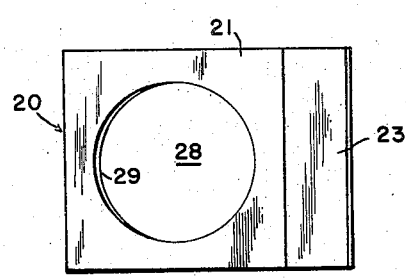
Figure 7 represents an elevational view of a modification of the novel lubricant distributing member showing the member without the lubricant distributing channels.
Figure 2:
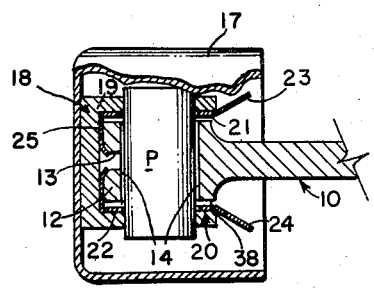
Figure 2 is a partial sectional view of the piston end of the connecting rod, similar to that of Figure 1 but showing the piston pin in elevation.
Figure 8:
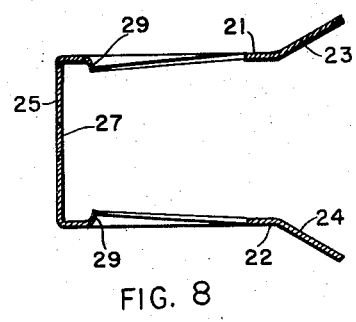
Figure 8 is a cross-sectional view through the lubricant distributing member of Figure 7.

As best seen in Figures 1 and 2, the connecting rod 10 is formed with a conventional crank end (not shown) and a piston end 12. Piston end 12 is formed with a piston pin bore or opening 14, the wall of which functions as a bearing for piston pin P. Obviously, bearing inserts may be provided within the scope of this invention. In a preferred embodiment of the invention illustrated in Figures 1–5, an oil bore 13 is formed in the unloaded end of connecting rod 10 extending through to opening 14.

Figure 3:
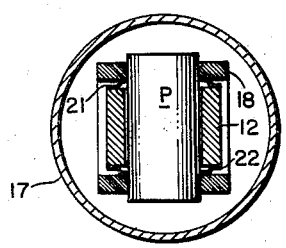
Figure 3 is a cross-sectional view on line 6—6 of Figure 1, with the piston pin shown in full view.
Figure 4:
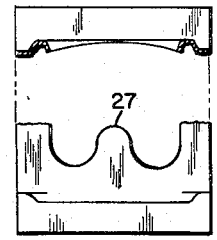
Figure 4 is an end view of the distributing member of Figure 7, with parts broken away to show the central dished aperture.

The piston head 16 is formed in a conventional manner as seen in Figures 1, 2 and 3, with skirt 17 extending down about the connecting rod. Though the piston head is here illustrated as of a smooth walled cylindrical configuration, it may obviously be formed in any conventional shape, either with or without piston rings.

A coupling member 18, as best seen in Figures 1, 2 and 3 is formed in a U-shape with the legs of the member extending about the piston end of the connecting rod. An aperture, as best seen in Figure 3 is formed in both legs to permit passage therethrough of piston pin P. The body portion 19 of the coupling member 18 is adapted to be secured to the underside of the piston head 16 (see Figures 1 and 2) by riveting, welding, or the like.

Provided for arrangement between coupling member 18, and the piston end 12 of the connecting rod, is a lubricant distributing member 20.

Figure 5:
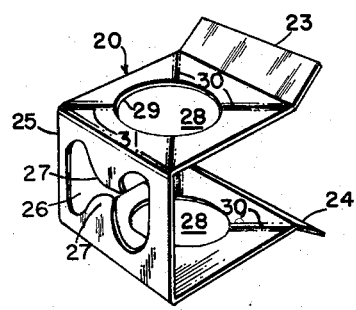
Figure 5 is a perspective view of a perferred embodiment of the lubricant distributing member illustrated in Figures 1–4.
Figure 6:
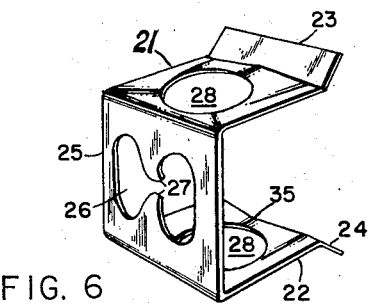
Figure 6 is a perspective view of the lubricant distributing member, illustrating a modified channel arrangement.
Figure 9:
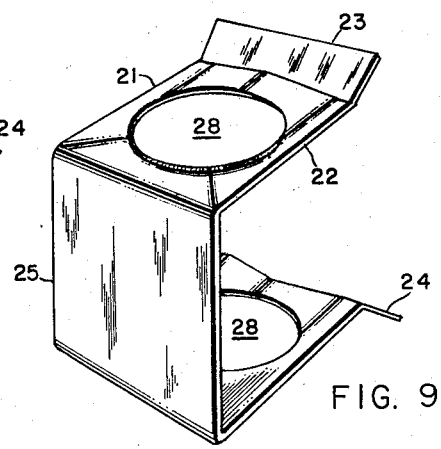
Figure 9 is a perspective view of a distributing member illustrated in Figure 7 with channels provided in the sides thereof.

The lubricant distributing member 20, as best seen in Figures 5 and 6 is of a substantially U-shaped configuration, with the opposed legs or sides indicated at 21 and 22. The member is formed of material having a degree of resiliency, such as spring steel. At least a portion of each of these legs is arranged to lie flush against the faces of the piston end of the connecting rod for the purpose to be made hereinafter more apparent. Outwardly flared flanges 23 and 24 are formed on the legs 21 and 22 respectively.

In the preferred embodiment of the invention illustrated in Figures 1-5, the cap end 25 connecting legs 21 and 22 of lubricant distributing member 20 is formed with an hour glass aperture 26, as seen in Figure 5. Inwardly pointed tabs 27 are depressed, and arranged to be mated up with bore 13, of the connecting rod. A circular aperture 28 of a size to permit passage therethrough of piston pin P is formed in each of the legs 21 and 22. Channels 30 are formed in the sides of member 20, extending from flanges 23 and 24 to aperture 28. Channels 31 lead from aperture 28 to cap end 25. In the preferred embodiment illustrated in Figures 1-5, these channels are radially directed with respect to aperture 28. As seen in Figure 3 a portion of the legs 21 and 22 respectively contacts the faces of the end section 12 of the connecting rod 10.

In the embodiment of the invention illustrated in Figure 6, the lubricant distributing member 20 is modified by providing a single channel 35 extending parallel to the sides of member 20 from the flanges 23 and 24 to aperture 28, in lieu of channels 30 illustrated in Figure 5.

Figures 7, 8, 9 and 10 illustrate how cap end 25 may be modified to eliminate the hour glass aperture 26 in the event the lubricant distributing member 20 is employed with a connecting rod not having an oil bore 13.

Where such an arrangement is employed, it is found desirable to provide a recess 36 in the opposite end walls 37 and 38 (not shown) of the connecting rod about at least a portion of the piston pin opening 14. This eccentric recess should extend at least about the unloaded end of the opening 14. Under these circumstances a portion 29 of the leg or side of the member 20 is depressed from the plane of the side, in the area adjacent the recess 36. Thus, lubricant tends to collect in a pocket formed by the recess and the undersurface of the depressed portion of the leg.

It is contemplated within the scope of this invention to combine or eliminate any of the aforedisclosed features.

Figure 10:
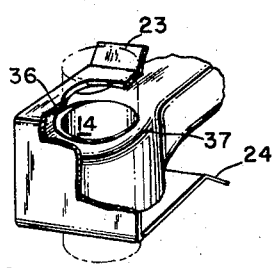
Figure 10 is a perspective view with parts broken away of the member of Figure 7 in position on the connecting rod.

In assembling the piston head 16 to the connecting rod 10, lubricating member 20 is positioned about the piston end 12 as seen in Figures 1, 2 and 10.

Coupling member 18 is then arranged over member 20, and piston pin P inserted through the aligned apertures in the legs of the coupling member and the distributing member 20 so that the central portion of pin P is retained in opening 14 of the connecting rod. Thereafter body portion 19 of coupling member 18 is secured to the underside of piston head 16.

In all embodiments, the member 20 itself serves as a spring member to space the sides of the piston end of the connecting rod 12 from the cheeks of the U-shaped member 18. This arrangement permits the connecting rod to "float" on the crank bearing thus eliminating any tendency for knocks.

Operation

The above disclosed construction may be employed in conjunction with any mechanisms having connecting rod-piston linkages, however, maximum value may be derived when the inventive features are employed in connection with horizontally acting pistons such as are employed in refrigeration compressors. In operation oil is provided to the crank shaft in a conventional manner, either through oil bores in the crank shaft, or by bathing the crank shaft in an oil sump.

At the crank shaft end of the connecting rod there will be some leakage of oil. This leakage of oil results in a fine spray being spun out about the connecting rod. Flanges 23 and 24 serve to collect some of this spray, whence it drains into the channels on legs or sides 21 and 22, and is conducted or guided to the piston pin. As seen in Figures 1-6, the lubricant distributing member 20, facilitates distribution of the oil collected on flanges 23 and 24, to the piston pin by means of tabs 27, which direct oil to bore 13, as well as channels 30, which drain oil into piston pin opening 14. The oil directed to cap end 25 serves to cool the area.

It is thus seen that a novel piston-rod assembly has been provided which facilitates lubrication of the piston pins without necessitating the boring of oil holes in the connecting rod, which tend to reduce the bearing area between the pin and the rod and increase production and maintenance costs. The U-shaped member 20 facilitates assembly since only a unitary element must be handled, rather than the plurality of washers conventionally employed, and the top clearance provided by the cap end of the washer increases cooling.

The above disclosure has been given by way of illustration and elucidation and not by way of limitation and it is desired to protect all embodiments of the hereindisclosed inventive concept within the scope of the appended claims.

I claim:

1. In combination a piston; a connecting rod having a bore extending therethrough and terminating in opposed sides thereof; a pin assembled in said bore; means associated with the piston for supporting portions of said pin to afford a connection between the piston and the rod; and a substantially U-shaped lubricant distributing member comprising opposed sides disposed adjacent the sides of the connecting rod, said sides having apertures therein and a cap portion connecting the sides, at least one of said sides being provided with a lubricant guiding channel extending to the aperture.

2. The invention set forth in claim 1 wherein said channel extends substantially axially of the side of the liquid distributing member.

3. The invention set forth in claim 1 wherein portions of the sides of said connecting rod adjacent the ends of the bore are recessed.

4. The invention set forth in claim 3 wherein a portion of the lubricant member surrounding the aperture is depressed from the plane of the side in the portion adjacent the recess in the connecting rod side.

5. In combination a piston; a connecting rod having a first bore extending therethrough and terminating in opposed sides thereof and a second bore connecting the first bore with the top of the connecting rod; a pin positioned in said bore; means associated with said piston for supporting said pin to provide a connection between said piston and rod; and a substantially U-shaped lubricant distributing member having opposed apertured sides and a connecting cap portion, said lubricant distributing member being arranged to receive and conduct lubricant to the first bore, said cap portion being provided with an opening formed to define at least one tongue in communication with said second bore in said rod.

6. The invention as described in claim 5 wherein the sides of said lubricant distributing member include diverging end portions.

7. The invention as described in claim 5 wherein at least one side of said lubricant distributing member side is provided with a channel to guide flow of lubricant.

8. A lubricant distributing member comprising a U-shaped member having opposed sides provided with aligned openings therein and a connecting cap portion, at least one of said sides being also provided with a channel extending to the opening therein.

9. The invention described in claim 8 wherein said cap is provided with an opening shaped to define confronting tongues.

10. The invention described in claim 8 wherein said legs are provided at their extremities with inclined flange portions.

11. The invention described in claim 8 wherein portions of the leg surrounding said opening are depressed out of the plane of said leg.

References Cited in the file of this patent
UNITED STATES PATENTS

| | | |
|---|---|---|
| 1,208,338 | Levedahl | Dec. 12, 1916 |
| 2,445,715 | Jennings | July 20, 1948 |
| 2,752,213 | Swart et al. | June 26, 1956 |